Figures 1, 2, 3:
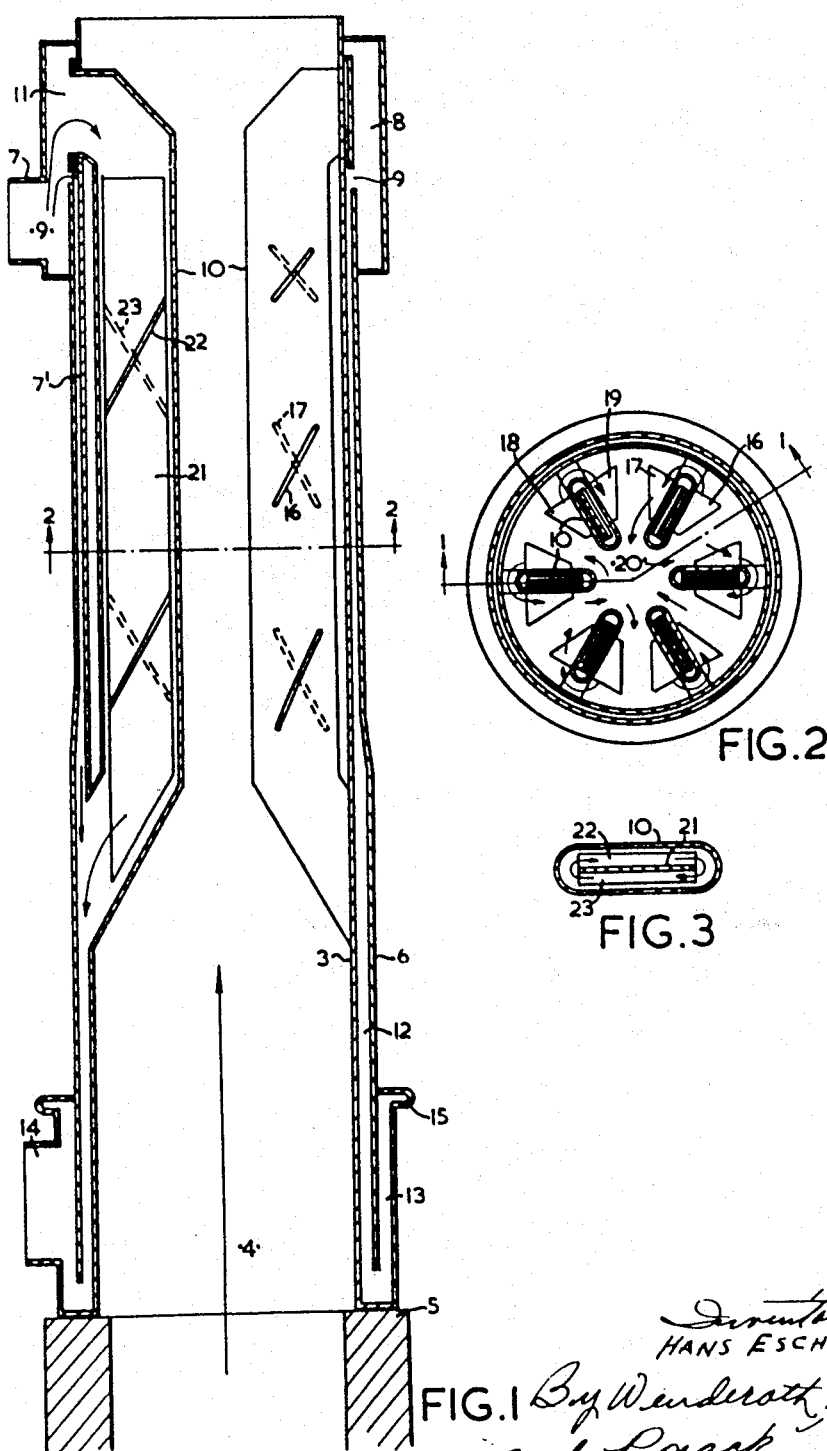

March 8, 1966 — H. ESCHER — 3,238,902
COMBUSTION FURNACE RECUPERATORS
Filed Dec. 26, 1963 — 2 Sheets-Sheet 1

Inventor
HANS ESCHER
By Wenderoth, Lind and Ponack
Attorneys

3,238,902
COMBUSTION FURNACE RECUPERATORS
Hans Escher, 19 Trentino Road, Turramurra,
New South Wales, Australia
Filed Dec. 26, 1963, Ser. No. 333,466
Claims priority, application Australia, Nov. 29, 1963,
38,276/63
7 Claims. (Cl. 110—56)

This invention relates to combustion furnace recuperators wherein the products of combustion exhausting from a furnace are used to preheat air, gases or gas mixtures. The invention is particularly useful in connection with high temperature furnaces such as those employed in the ferrous and non-ferrous industries and in glass melting.

Difficulties are encountered in high temperature recuperators, especially in large units, due to uneven heating of the heat transfer surfaces resulting in distortions of parts of the recuperator. This uneven heating can be caused by uneven flow distribution, uneven temperature distribution in the stream of combustion products, and uneven heat transfer conditions particularly when one side only of a heat transfer element is exposed to flue radiation.

The present invention provides a recuperator in which this uneven heating is reduced with economy in flow resistance and high efficiency in heat transfer.

An object of this invention is to provide a combustion furnace recuperator having a flue having an inlet end, a plurality of hollow heat transfer members arranged within the flue and extending longitudinally of the flue, each heat transfer member being oblong in cross-section with two flat sides directed toward the centre of the flue, means for leading air or gas to be heated to the interiors of one end of each heat transfer member, means for leading the heated air or gas from the interiors of the other end of each heat transfer member, deflectors outside each heat transfer member, whereby flue gas is caused to circulate around each heat transfer member, the deflectors for adjacent heat transfer members being oppositely directed, whereby the flue gas circulation is in the opposite direction around adjacent heat transfer members.

A further object of this invention is to provide a combustion furnace recuperator having a flue having an inlet end, a plurality of hollow heat transfer members arranged within the flue and extending longitudinally of the flue, each heat transfer member being oblong in cross-section with two flat sides directed toward the centre of the flue, means for leading air or gas to be heated to the interiors of one end of each heat transfer member, means for leading the heated air or gas from the interiors of the other end of each heat transfer member, a strip extending along the major axis or dimension of each heat transfer member for at least a major part of the length of the member, and deflectors inside the heat transfer members on each side of the said strip to cause the air or gas to be heated to be displaced from one side of the strip to the other side of the strip.

Reference will now be made to the accompanying drawings in which

Figure 4:
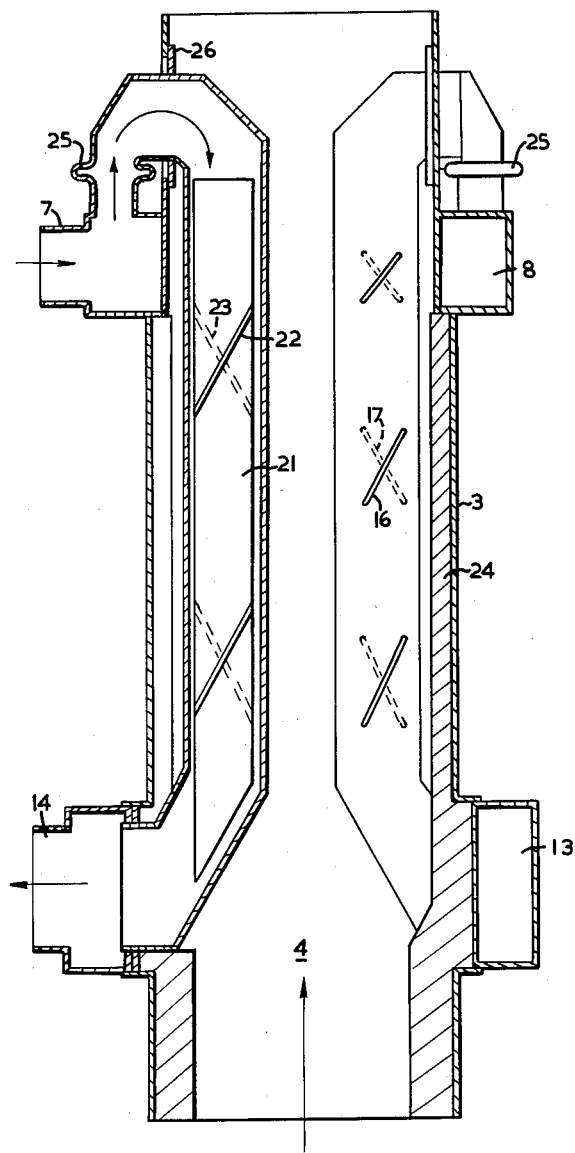

FIGURE 1 is a section of a recuperator in accordance with this invention taken along the line 1—1 in FIGURE 2, FIGURE 2 is a cross-section along the line 2—2 of FIGURE 1, FIGURE 3 is an enlarged cross-section of one of the heat transfer members showing the internal deflectors only, and FIGURE 4 is a cross-section across a second recuperator in accordance with this invention.

Referring now to FIGURES 1 to 3, the recuperator includes a cylindrical flue 3 having an inlet end 4 which receives flue gas exhausting from a furnace 5. The flue is surrounded by a closely spaced outer shell 6. The gas to be heated, hereinafter referred to as air, is supplied by way of an inlet branch 7 to an annular distribution box 8. A portion of the air flows in the annular space 7' between the flue 3 and shell 4, entering through the openings 9, and heat transfer to the air from the flue gases takes place through the flue wall 3. A plurality of hollow heat transfer members 10 are provided which extend longitudinally along and inside the flue with their upper ends communicating with the distribution box 8 by openings 11. The heated air issuing from the lower ends of the members 10 mixes with the air from the annular space 7' in an enlarged annular space 12, and the total air stream collects in an annular hot air box 13 and is discharged through outlet branch 14. To accommodate differences in thermal expansion between the heat transfer members 10 and the shell 2 a slide expansion joint is provided for each member. An expansion joint 15 is provided to take care of differences in thermal expansion between the inner shell 3 and outer shell 4.

The heat transfer members 10 are each oblong in cross-section with their longer axes or dimensions arranged radially in the flue. They are flat sided in their major faces and are evenly spaced inside the flue, and have clearance all round from the flue to permit rotational movement of the flue gases around them. Flow deflectors are provided to deflect the flue gases around the heat transfer members. The flow deflectors may be strips 16, 17, 18, 19 welded at an angle to the outside surface of the heat transfer members. The deflector 16 on one side of a member 10 has an opposite slope, that is oppositely directed, to that on the other side of the member. Deflector 16 causes the flue gases to be displaced toward the periphery of the flue 3 and deflector 17 on the other side causes the flue gases to be displaced toward the centre of the flue into the mixing area 20. The deflectors 18, 19 on the adjacent heat transfer member are positioned so as to cause an oppositely directed flow around it, i.e., the flow is counterclockwise around the member to which deflectors 16, 17 are attached, and clockwise around the member to which deflectors 18, 19 are attached. The flue gas flow is similarly oppositely directed around adjacent heat transfer members as shown by the arrows in FIGURE 2. More than one row of deflectors may be provided, as is shown in FIGURE 1, and the slope of those nearer the cooler outlet end may be increased compared to those at the hotter inlet end 4 so as to increase the convective heat transfer rate.

Each heat transfer member 10 has inside it a strip 21 which may extend part or full length of the member. The strip is placed along the major axis of the heat transfer member so that there is clearance all round between the strip and the heat transfer member. Air is caused to be displaced from one side of the strip to the other as it moves down the heat transfer member by internal deflectors or fins 22, 23. The fins on opposite sides of the strip have opposing slopes to ensure a positive displacement with a minimum of pressure drop.

While the deflectors 16, 17, 18, 19 have been shown affixed to the heat transfer member they could alternatively be secured to the flue wall. Similarly the deflectors could be secured to the internal wall of the heat transfer members instead of to the strip 21.

Another recuperator according to the invention is shown in longitudinal section in FIGURE 4. The annular shell 4 used in FIGURES 1 to 3 is not used, and instead the internal face of the flue shell 3 is lined with heat insulating material 24. All the air to be heated passes through the heat transfer members 10. The preferred shape of the flue is circular but other shapes such as rectangular can be used. The heat transfer members 10 are connected to the cold air distribution box 8 by means of an expansion bellows 25. At their discharge end the heat transfer members are connected to the hot air box 13. A sliding joint 26 is provided at the flue outlet to accommodate the thermal expansion of the heat transfer members.

What I claim is:

1. A combustion furnace recuperator comprising a flue having an inlet end, and even number of hollow heat transfer members arranged within the flue and extending longitudinally of the flue, each heat transfer member being oblong in cross-section with two flat sides directed toward the centre of the flue, means for leading gas to be heated to the interiors of one end of each heat transfer member, means for leading heated gas from the interiors of the other end of each heat transfer member, a plurality of straight obliquely positioned deflectors secured to the outside of the flat sides of the even-numbered heat transfer members, deflectors on opposite sides of a heat transfer member being oppositely directed, whereby flue gas is caused to circulate around the even-numbered heat transfer members in one direction, and a plurality of straight obliquely positioned deflectors secured to the outside of the flat sides of the odd-numbered heat transfer members, deflectors on opposite sides of an odd-numbered heat transfer member being oppositely directed, and adjacent deflectors on respective even and odd-numbered heat transfer members being similarly directed, whereby flue gas is caused to circulate around the odd-numbered heat transfer members in a direction opposite to said one direction.

2. A combustion furnace recuperator comprising a flue having an inlet end, an even number of hollow heat transfer members arranged within the flue and extending longitudinally of the flue, each heat transfer member being oblong in cross-section with two flat sides directed toward the centre of the flue, means for leading gas to be heated to the interiors of one of each heat transfer member, means for leading heated gas from the interiors of the other end of each heat transfer member, a plurality of straight obliquely positioned deflectors secured to the outside of the flat sides of the even-numbered heat transfer members, deflectors on opopsite sides of a heat transfer member being oppositely directed, whereby flue gas is caused to circulate around the even-numbered heat transfer members in one direction, a plurality of straight obliquely positioned deflectors secured to the outside of the flat sides of the odd-numbered heat transfer members, deflectors on opposite sides of an odd-numbered heat transfer member being oppositely directed, and adjacent deflectors on respective even and odd-numbered heat transfer members being similarly directed, whereby flue gas is caused to circulate around the odd-numbered heat transfer members in a direction opposite the said one direction, a flat strip disposed within each of said heat transfer members and extending along the major axis of each heat transfer member for at least a major part of the length of the member, and a plurality of straight obliquely positioned deflectors secured to each side of the said strips, the deflectors on opposite sides of a strip being oppositely directed, whereby gas to be heated is displaced from one side to the other of the said strip.

3. A combustion furnace recuperator comprising a flue having an inlet end, an even number of hollow heat transfer members arranged within the flue and extending longitudinally of the flue, each heat transfer member being oblong in cross-section with two flat sides directed toward the centre of the flue, means for leading gas to be heated to the interiors of one end of each heat transfer member, means for leading heated gas from the interiors of the other end of each heat transfer member, a plurality of pairs of straight obliquely positioned deflectors secured to the outside of the flat sides of the even-numbered heat transfer members, deflectors on opposite sides of a heat transfer member being oppositely directed, whereby flue gas is caused to circulate around the even-numbered heat transfer members in one direction, the slope of the deflectors of the pairs at the cooler end of the recuperator being greater than that of the deflectors at the hotter end, and a plurality of pairs of straight obliquely positioned deflectors secured to the outside of the flat sides of the odd-numbered heat transfer members, deflectors on opposite sides of an odd-numbered heat transfer member being oppositely directed, and adjacent deflectors on respective even and odd-numbered heat transfer members being similarly directed, whereby flue gas is caused to circulate around the odd-numbered heat transfer members in a direction opposite one direction, the slope of the deflectors of the pairs secured to the odd-numbered heat transfer members at the cooler end of the recuperator being greater than the slope of the deflectors at the hotter end.

4. A combustion furnace recuperator comprising a flue having an inlet end, an even number of hollow heat transfer members arranged within the flue and extending longitudinally of the flue, each heat transfer member being oblong in cross-section with two flat sides directed toward the centre of the flue, means for leading gas to be heated to the interiors of one end of each heat transfer member, means for leading heated gas from the interiors of the other end of each heat transfer member, a plurality of pairs of straight obliquely positioned deflectors secured to the outside of the flat sides of the even-numbered heat transfer members, deflectors on opposite sides of a heat transfer member being oppositely directed, whereby flue gas is caused to circulate around the even-numbered heat transfer members in one direction, the slope of the deflectors of the pairs at the cooler end of the recuperator being greater than that of deflectors at the hotter end, a plurality of pairs of straight obliquely positioned deflectors secured to the outisde of the flat sides of the odd-numbered heat transfer members, deflectors on opposite sides of an odd-numbered heat transfer member being oppositely directed, and adjecent deflectors on respective even and odd-numbered heat transfer members being similarly directed, whereby flue gas is caused to circulate around the odd-numbered heat transfer members in a direction opposite one direction, the slope of the deflectors of the pairs secured to the odd-numbered heat transfer members at the cooler end of the recuperator being greater than the slope of the deflectors at the hotter end, a flat strip disposed within each of said heat transfer members and extending along each heat transfer member parallel to its flat sides for at least a major part of the length of the member, and a plurality of straight obliquely positioned deflectors secured to each side of the said strips, the deflectors on opposite sides of a strip being oppositely directed, whereby gas to be heated is displaced from one side to the other of the said strip.

5. A combustion furnace recuperator comprising a cylindrical flue having an inlet end, an annular shell surrounding the flue and providing therebetween an air heating passage, a distribution box surrounding one end of the annular shell for distributing air to be heated to the said air heating passage, a hot air box surrounding the other end of the annular shell for leading away heated air from the said air heating passage, an even-numbered plurality of hollow heat transfer members arranged within the flue and extending longitudinally of the flue, each heat transfer member being oblong in cross-section with two flat sides directed toward the centre of the flue inlet ends to the heat transfer members from the said air heating passage, exit ends to the heat transfer members into the hot air box, straight deflectors outside each heat transfer member and on each flat side thereof, each deflector making an angle with the axis of the flue, and deflectors on opposite sides of a heat transfer member being oppositely directed, whereby flue gas is caused to circulate around each heat transfer member, the deflectors on adjacent sides of adjacent heat transfer members being similarly directed, whereby the flue gas circulation is in the opposite direction around adjacent heat transfer members.

6. A combustion furnace recuperator comprising a cylindrical flue having an inlet end, an annular shell surrounding the flue and providing therebetween an air heating passage, a distribution box surrounding one end of the annular shell for distributing air to be heated to the said air heating pasasge, a hot air box surrounding the other end of the annular shell for leading away heated air from the said air heating passage, an even-numbered plurality of hollow heat transfer members arranged within the flue and extending longitudinally of the flue, each heat transfer member being oblong in cross-section with two flat sides directed toward the centre of the flue, an unobstructed central portion to the flue between the adjacent ends of heat transfer members lying in the same diameter, inlet ends to the heat transfer members from the said air heating passage, exit ends to the heat transfer members into the hot air box, straight deflectors outside each heat transfer member and on each flat side thereof, each deflector making an angle with the axis of the flue, and deflectors on opposite sides of a heat transfer member being oppositely directed, whereby flue gas is caused to circulate around each heat transfer member, the deflectors on adjacent sides of adjacent heat transfer members being similarly directed, whereby the flue gas circulation is in the opposite direction around adjacent heat transfer members, a flat strip disposed within each of said heat transfer members and extending along the axis of each heat transfer member parallel to the said flat sides, and straight deflectors on each side of each flat strip, each last-mentioned deflector making an angle to the axis of the flue, deflectors on opposite sides of the said strip being oppositely angularly directed to cause the air to be displaced from one side to the other of the said strip.

7. A combustion furnace recuperator comprising a flue having an inlet end, a plurality of hollow heat transfer members arranged within the flue and extending longitudinally of the flue, each heat transfer member being oblong in cross-section with two flat sides directed toward the center of the flue, means for leading gas to be heated to the interiors of one end of each heat transfer member, means for leading heated gas from the interiors of the other end of each heat transfer member, a plurality of straight obliquely positioned deflectors outside the flat sides of the heat transfer members, deflectors on opposite sides of a heat transfer member being oppositely directed, whereby flue gas is caused to circulate around the heat transfer members, and deflectors on adjacent sides of adjacent heat transfer members being similarly directed, whereby flue gas is caused to circulate around alternate transfer members in opposite directions.

References Cited by the Examiner

UNITED STATES PATENTS

| | | | |
|---|---|---|---|
| 1,324,714 | 12/1919 | Cellen | 165—179 |
| 1,709,745 | 4/1929 | Schroers | 165—183 |
| 2,779,573 | 1/1957 | Kuroda | 110—56 |

FOREIGN PATENTS 17,264  4/1913  Denmark.

KENNETH W. SPRAGUE, *Primary Examiner.*

FREDERICK L. MATTESON, JR., *Examiner.*